(12) United States Patent
Cheng et al.

(10) Patent No.: US 9,298,870 B1
(45) Date of Patent: Mar. 29, 2016

(54) METHOD FOR DESIGNING TOPOGRAPHIC PATTERNS FOR DIRECTING THE FORMATION OF SELF-ASSEMBLED DOMAINS AT SPECIFIED LOCATIONS ON SUBSTRATES

(75) Inventors: Joy Cheng, San Jose, CA (US); Kafai Lai, Poughkeepsie, NY (US); Chi-Chun Liu, San Jose, CA (US); Jed W. Pitera, Portola Valley, CA (US); Charles T. Rettner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 13/472,598

(22) Filed: May 16, 2012

(51) Int. Cl.
*G06F 17/50* (2006.01)

(52) U.S. Cl.
CPC ........ *G06F 17/5068* (2013.01); *G06F 2217/08* (2013.01)

(58) Field of Classification Search
CPC ......... G03F 1/44; G03F 1/36; G06F 17/5068; G06F 7/705; G06F 2217/08; G06F 2217/10; G06F 2217/12; G06F 2217/16
USPC ............................................... 716/50, 54–55
See application file for complete search history.

(56) References Cited

U.S. PATENT DOCUMENTS

| 5,948,470 | A | 9/1999 | Harrison et al. |
| 6,926,953 | B2 | 8/2005 | Nealey et al. |
| 7,811,940 | B2 | 10/2010 | Sandhu |
| 7,923,373 | B2 | 4/2011 | Sandhu |
| 7,964,107 | B2 | 6/2011 | Millward |
| 8,010,913 | B2 | 8/2011 | Poonawala et al. |
| 8,856,693 | B2 * | 10/2014 | Cheng ........................ G03F 1/38 716/50 |
| 9,182,673 | B2 * | 11/2015 | Wuister ................. G03F 7/0002 |
| 9,183,870 | B2 * | 11/2015 | Nealey ................ B81C 1/00031 |
| 2005/0014151 | A1 * | 1/2005 | Textor ...................... A61L 27/34 435/6.19 |
| 2010/0203430 | A1 | 8/2010 | Ye et al. |
| 2010/0294740 | A1 | 11/2010 | Cheng et al. |
| 2011/0147983 | A1 * | 6/2011 | Cheng ................. B81C 1/00031 264/220 |
| 2011/0209106 | A1 * | 8/2011 | Cheng ........................ G03F 1/38 716/55 |
| 2012/0331428 | A1 * | 12/2012 | Cheng ........................ G03F 1/38 716/52 |

FOREIGN PATENT DOCUMENTS

| CN | 101681812 | 3/2010 |
| CN | 101950719 | 1/2011 |
| CN | 101952947 | 1/2011 |

OTHER PUBLICATIONS

Park et al., Directed Self-Assembly of Lamellar Microdomains of Block Copolymers Using Topographic Guiding Patterns, Macromolecules 2009, 42, pp. 5895-5899.

* cited by examiner

*Primary Examiner* — Stacy Whitmore
(74) *Attorney, Agent, or Firm* — Schmeiser, Olsen & Watts

(57) ABSTRACT

Methods and computer program products for designing topographic patterns for directing the formation of self-assembled domains at specified locations on substrates. The methods include generating mathematical models that operate on mathematical descriptions of the number and locations of cylindrical self-assembled domains in a mathematical description of a guiding pattern.

32 Claims, 11 Drawing Sheets

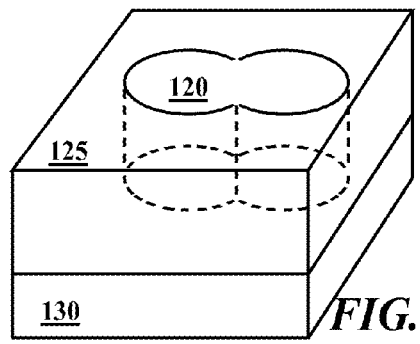
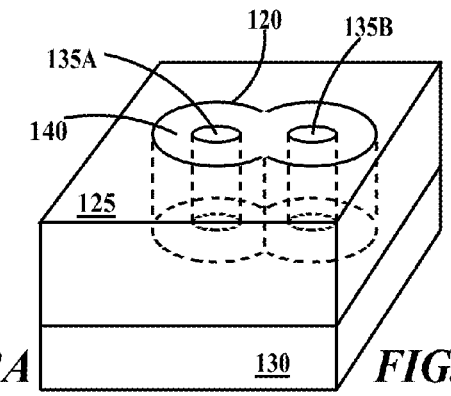
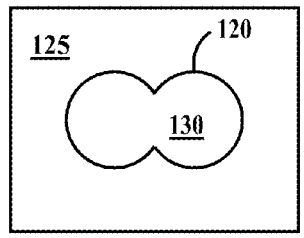
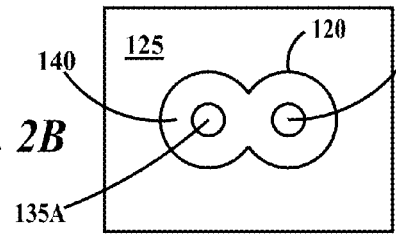
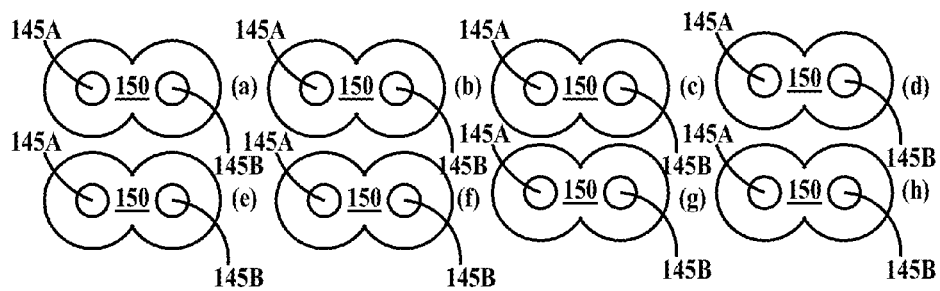
FIG. 3A
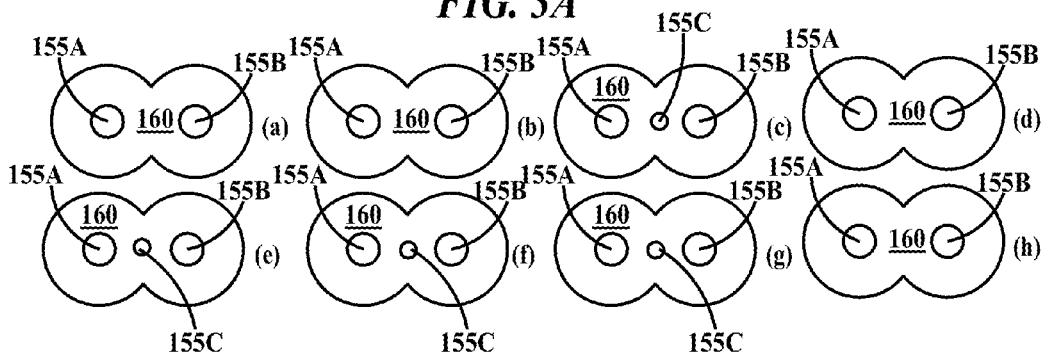
FIG. 3B

METHOD FOR DESIGNING TOPOGRAPHIC PATTERNS FOR DIRECTING THE FORMATION OF SELF-ASSEMBLED DOMAINS AT SPECIFIED LOCATIONS ON SUBSTRATES

This invention was made with government support under FA8650-10-C-7038 awarded by the Defense Advanced Research Projects Agency (DARPA). The government has certain rights in the invention.

FIELD OF THE INVENTION

The present invention relates to the field of integrated circuit fabrication; more specifically, it relates to a method and computer system for designing topographic patterns for directing the formation of self-assembled domains at specified locations on substrates.

BACKGROUND

Directed self-assembly (DSA), which combines self-assembling materials and a lithographically defined prepattern on a photomask, is a potential candidate to extend optical lithography. A lithographically-defined guiding pattern serves to direct the self-assembly process and the pattern formed by the self-assembling materials. The resolution enhancement and self-healing effects of DSA are particularly useful for extending the resolution of optical lithography and to rectify the ill-defined patterns printed by optical lithography. To take full advantage of DSA for extending optical lithography requires modeling of the guiding pattern to be used in the photomask. Current models and methods produce guiding patterns that often cause the number and locations of DSA domains to vary from the specified number and/or locations. Accordingly, there exists a need in the art to mitigate the deficiencies and limitations described hereinabove.

SUMMARY

A first aspect of the present invention is a method of designing a guiding pattern opening in a layer on a substrate, the guiding pattern opening yielding a set of self-assembled domains at specified locations within the guiding pattern opening when the guided pattern opening is filled with a self-assembly material that undergoes directed self-assembly, the method comprising: (a) specifying a number and corresponding locations of self-assembled domains; (b) generating a mathematical description of an initial guiding pattern opening based on the specified number and locations of self-assembled domains and designating the initial guiding pattern opening as a current guiding pattern opening; (c) using a computer, computing a mathematical model to generate calculated numbers and calculated high-probability locations of self-assembled domains within the current guiding pattern opening, wherein the function represents the relative probability that the self-assembled domains will form at the specified locations within the current guiding pattern opening; (d) comparing the calculated number of high-probability locations of the mathematical model with the specified number of self-assembled domains and comparing the calculated locations of the high-probability locations with the specified locations of self-assembled domains; (e) adjusting the current guiding pattern opening based on the comparing of step (d); and (f) repeating steps (c) to (e) until both (i) the calculated number of self-assembled domains and the specified number of self-assembled domains is the same and (ii) the high-probability locations of self-assembled domains and the specified locations of self-assembled domains agree within a specified range.

A second aspect of the present invention is a method of designing a guiding pattern opening in a layer on a substrate, the guiding pattern opening yielding a set of self-assembled domains at specified locations within the guiding pattern opening when the guided pattern opening is filled with a self-assembly material that undergoes directed self-assembly, the method comprising: (a) specifying a number and corresponding locations of self-assembled domains; (b) generating a mathematical description of a guiding pattern opening based on the specified number and locations of self-assembled domains; (c) defining a mathematical model of the probability of the formation of self-assembled domains based on the mathematical description of the guiding pattern opening; (d) using a computer, using the mathematical model to compute the probability that the number of specified self-assembled domains will form at the specified locations within the guiding pattern opening; (e) determining derivatives of the mathematical model with respect to parameters of the mathematical description of the guiding pattern opening; and (f) maximizing the probability for formation of self-assembled domains at the specified locations within the initial guiding pattern opening using the derivatives to adjust the locations defining the walls of the guiding pattern opening using an optimization algorithm.

A third aspect of the present invention is a non-transitory computer readable storage device having a computer readable program code embodied therein, the computer readable program code comprising an algorithm adapted to implement a method for designing a guiding pattern opening in a layer on a substrate, the guiding pattern opening yielding a set of self-assembled domains at specified locations within the guiding pattern opening when the guided pattern opening is filled with a self-assembly material that undergoes directed self-assembly, the method comprising the steps of: (a) generating a mathematical description of an initial guiding pattern opening based on a user-specified number of, and corresponding locations of, self-assembled domains; (b) designating the initial guiding pattern opening as a current guiding pattern opening; (c) computing a mathematical model to generate calculated numbers and calculated high-probability locations of self-assembled domains within the current guiding pattern opening, wherein the function represents the relative probability that the self-assembled domains will form at the specified locations within the current guiding pattern opening; (d) comparing the calculated number of high-probability locations of the mathematical model with the specified number of self-assembled domains and comparing the calculated locations of the high-probability locations with the specified locations of self-assembled domains; (e) adjusting the current guiding pattern opening based on the comparing of step (d); and (f) repeating steps (c) to (e) until both (i) the calculated number of self-assembled domains and the specified number of self-assembled domains is the same and (ii) the high-probability locations of self-assembled domains and the specified locations of self-assembled domains agree within a specified range.

A fourth aspect of the present invention is a non-transitory computer readable storage device having a computer readable program code embodied therein, the computer readable program code comprising an algorithm adapted to implement a method for designing a guiding pattern opening in a layer on a substrate, the guiding pattern opening yielding a set of self-assembled domains at specified locations within the guiding pattern opening when the guided pattern opening is filled with a self-assembly material that undergoes directed self-assembly, the method comprising the steps of: (a) generating a mathematical description of a guiding pattern opening based on a user-specified number of, and corresponding locations of, self-assembled domains; (b) defining a mathematical model of the probability of the formation of self-assembled domains based on the mathematical description of the guiding pattern opening; (c) using the mathematical model to compute the probability that the number of specified self-assembled domains will form at the specified locations within the guiding pattern opening; (d) determining derivatives of the mathematical model with respect to parameters of the mathematical description of the guiding pattern opening; and (e) maximizing the probability for formation of self-assembled domains at the specified locations within the initial guiding pattern opening using the derivatives to adjust the locations defining the walls of the guiding pattern opening using an optimization algorithm.

These and other aspects of the invention are described below.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings, wherein:

FIGS. 2A-2D illustrate domain formation of a self-assembly material in a guiding pattern;

FIGS. 3A and 3B illustrate Monte Carlo simulation results of directed self-assembly in two different guiding patterns;

DETAILED DESCRIPTION

The semiconductor industry is constantly attempting to manufacture smaller and smaller transistors in order to increase the performance and decrease the cost of integrated circuits. Current transistor feature sizes range from 65 nanometers (nm) down to 22 nm. These sizes are at the limit of what can be patterned directly by optical lithography.

The embodiments of the present invention relate to a patterning technology known as directed self-assembly (DSA) which can produce these smaller sized images needed in advanced integrated circuit fabrication. Directed self-assembly is a hybrid approach that uses optical, imprint or electron beam lithography to produce a "guiding pattern" on a substrate which is then coated with a self-assembling material. The self-assembling material then undergoes self-assembly, the formation of regular well-defined structures or domains whose size, shape, and arrangement are defined by the chemical structure of the self-assembly material and the geometry of the guiding pattern. The guiding patterns serve to direct the self-assembled domains to form in particular locations or orientations. The chemical difference between the domains in the self-assembling material can then be exploited to transfer a pattern down into the substrate by selectively dissolving one of the domains and using the remaining domain(s) as an etch mask. Preferred aspects of the present invention are methods of designing guiding patterns for DSA.

Figure 1A:
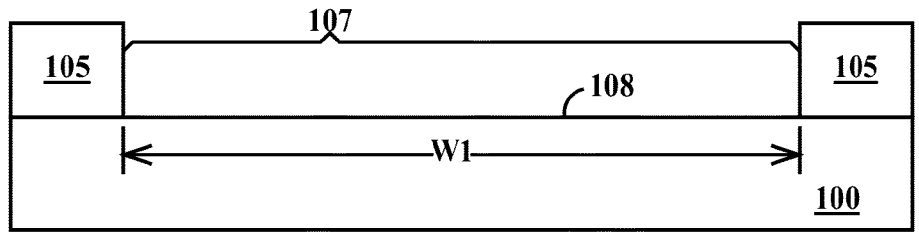
FIGS. 1A-1F are cross-sectional views illustrating an exemplary method of forming a pattern in a substrate using directed self-assembly.
Figure 1B:
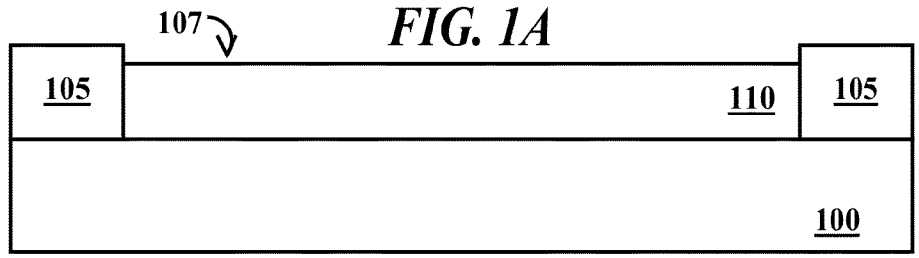
Figure 1C:
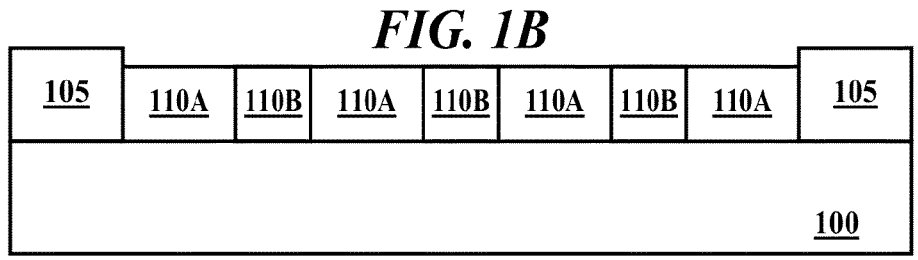
Figure 1D:
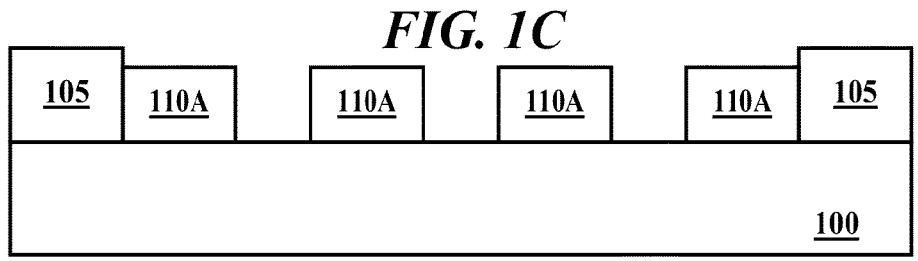
Figure 1E:
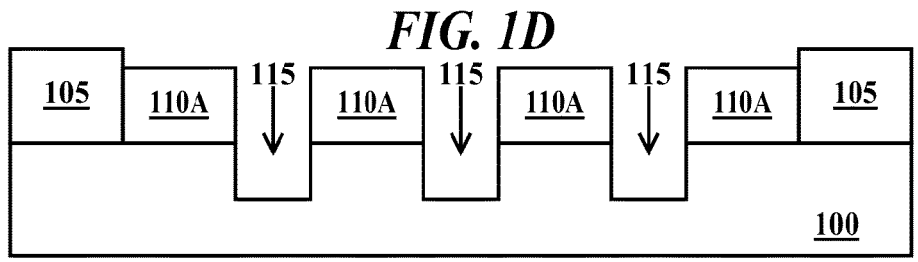
Figure 1F:
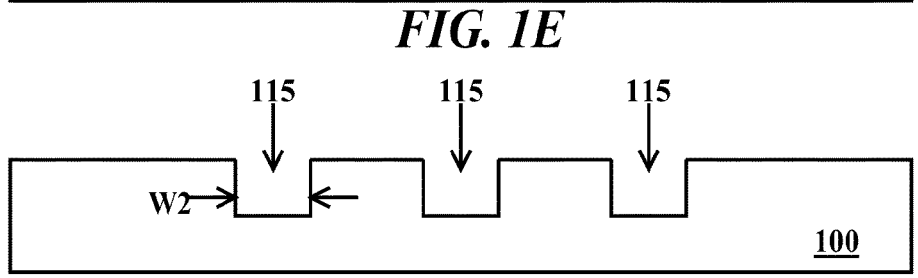

FIGS. 1A-1F are cross-sectional views illustrating an exemplary method of forming a pattern in a substrate using directed self-assembly. In FIG. 1A, formed on substrate 100 is a patterned layer 105 having an opening 107 in which a top surface 108 of substrate 100 is exposed. In one example, patterned layer 105 is formed using a photolithographic process and may comprise a patterned photoresist layer. In one example, patterned layer 105 is a hard mask formed using a patterned photoresist layer as a template. In one example, patterned layer 105 may be formed using imprint technology in which a three-dimensional pattern is pressed into a polymer layer and the thinner regions are then removed to expose the underlying substrate. Opening 107 is a guiding pattern for DSA. Opening 107 has a width W1. In FIG. 1B, a DSA material 110 is formed in the opening 107. In FIG. 1C, DSA material 110 has self-assembled into outer domains 110A and inner domains 110B. In one example, heating the DSA material initiates the DSA process. DSA materials and the self-assembly process are described in more detail infra. In FIG. 1D, inner domains 110B (see FIG. 1C) are removed, exposing substrate 100. In one example, the inner domains are removed by dissolution in a solvent. In one example, the inner domains are removed by plasma etching or reactive ion etching (RIE). In FIG. 1E trenches 115 are etched into substrate 100. In one example, trenches 115 are formed using a wet etch. In one example, trenches 115 are formed using RIE. In FIG. 1F patterned layer 105 and outer domains 110A (see FIG. 1E) are removed leaving trenches 115 in substrate 100. Trenches 115 have a width W2, where W2 is less than W1. In one example, substrate 100 is a semiconductor substrate. In one example, substrate 100 represents a layer (e.g., of oxide, nitride, polysilicon, other dielectric material or metal) to be patterned on a semiconductor substrate or on a non-semiconductor substrate.

FIGS. 2A-2D illustrate domain formation of a self-assembly material in a guiding pattern. In FIGS. 2A-2D the inner DSA domains are approximately cylindrical in shape while the outer domains take the shape of the guiding pattern. FIG. 2A is an isometric view and FIG. 2B is a top view of a guiding pattern. In FIGS. 2A and 2B, a guiding pattern 120 is formed in a layer 125 formed on a substrate 130. A physical guiding pattern is an opening in a layer and is three-dimensional. A design for a guiding pattern is two-dimensional and defines the perimeter of the guiding pattern at the surface (top or bottom) of layer 125. In the example of FIGS. 2A and 2B, guiding pattern 130 is in the form of two intersecting cylinders. FIG. 2C is an isometric view and FIG. 2D is a top view of DSA of a domain formed in a cylinder-forming DSA material. In FIGS. 2C and 2D, two cylindrical inner domains 135A and 135B are surrounded by an outer domain 140.

The hybrid character of DSA poses a challenge for the computational tools currently used to design lithographic masks. The structure to be formed by the first patterning step (e.g., opening 107 of FIG. 1A) is now the guiding pattern, not the final on-chip structure (e.g., trenches 115 of FIG. 1F). The guiding pattern has to be appropriately shaped in order for the self-assembled domains produced in the second patterning step (e.g., domains 110A and 110B of FIGS. 1C and 1D) to form the final structure.

A key issue with the use of DSA in lithographic mask design is the need for a model to predict the location and structure of the self-assembled domains, since it is these domains that form the final pattern of interest. Since self-assembly is a partially stochastic process, with some degree of randomness, a model can only predict the probable locations and structures of the self-assembled domains. Some guiding pattern shapes will reliably yield the same type of self-assembled domains at the same locations within the guiding pattern. Other guiding pattern shapes can cause the self-assembling material to behave in an unreliable fashion, varying the number, shape, and location of the self-assembled domains in a stochastic manner. An example of this stochastic behavior is shown in FIG. 3.

FIGS. 3A and 3B illustrate Monte Carlo simulation results of directed self-assembly in two different guiding patterns. In FIG. 3A, formation of two inner domains 145A and 145B in a "good" guiding pattern 150 has been simulated eight times. Guiding pattern 150 is "good" because the domains 145A and 145B reliably produced in the desired locations all eight times. In FIG. 3B, formation of two inner domains 155A and 155B in a "bad" guiding pattern 160 has been simulated eight times. Guiding pattern 160 is "bad" because only in four of the eight simulations have the domains 155A and 155B reliably produced in the desired locations. Guiding pattern 160 has also generated a third domain 155C in the other four simulations with roughly equal probability as domains 155A and 155B. While Monte Carlo simulations are accurate, they are orders of magnitude too slow to be used in mask design where thousands of guiding patterns would need to be simulated.

In order to accurately predict number and locations of inner domains, it is necessary to know the probability of self-assembled domain formation at each point (x,y) on the surface of the substrate. This "DSA domain probability function" P(x,y) is schematically illustrated in FIG. 4. If the high-probability locations coincide with designed final pattern locations, we have a "good" guiding pattern design. If the high-probability locations deviate from designed final pattern (e.g., they occur in the wrong positions, or there are more or fewer high-probability locations than desired), then the guiding pattern is "bad."

Figure 4A:
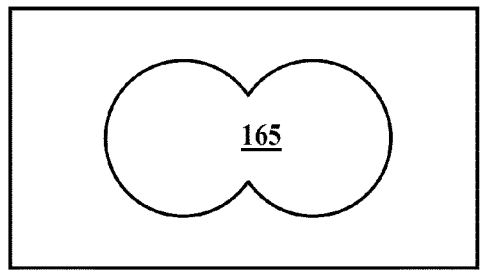
FIGS. 4A through 4D illustrate the directed self-assembly domain probability function P(x,y) in two different guiding patterns according to embodiments of the present invention.
Figure 4C:
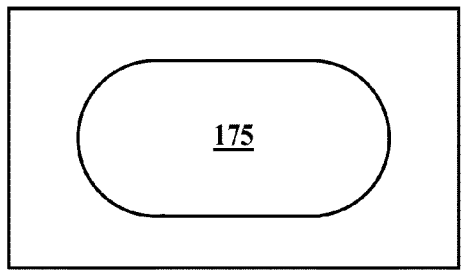
Figure 4B:
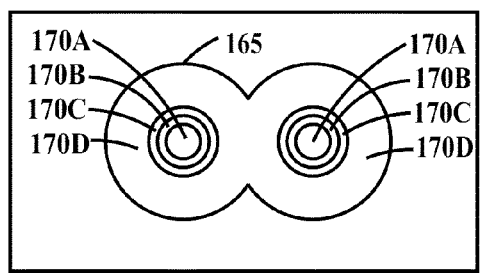
Figure 4D:
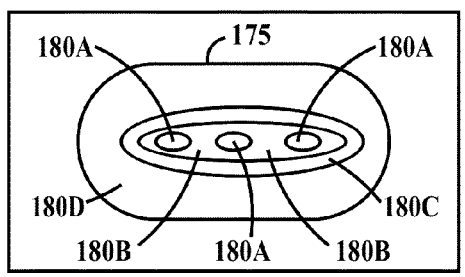

FIGS. 4A through 4D illustrate the directed-self-assembly domain probability function P(x,y) in two different guiding patterns according to embodiments of the present invention. FIG. 4A is a top view of a "good" guiding pattern 165. FIG. 4B is a top view of the probability distribution for domain formation represented by four probability regions 170A, 170B, 170C, and 170D progressing from highest probability in region 170A to lowest (non-zero) probability in region 170D. There are two high-probability regions 170A. Within guiding pattern 165 P(x,y)>0. Without guiding pattern 165 P(x,y)=0. FIG. 4C is a top view of a "bad" guiding pattern 175. FIG. 4D is a top view of the probability distribution for domain formation represented by four probability regions 180A, 180B, 180C and 180D progressing from highest probability in region 180A to lowest (non-zero) probability in region 180D. Within guiding pattern 175 P(x,y)>0. Without guiding pattern 175 P(x,y)=0. There are three high-probability regions 180A, when only two are wanted.

The most common self-assembling materials used in DSA are block copolymers. Block copolymers are linear polymer chains whose chemical composition changes along their length, with "blocks" of different types of monomer. A common material made up of two different monomers (a "di-block copolymer") is polystyrene-block-polymethylmethacrylate (PS-b-PMMA). The chemical differences between the monomers making up each block provide the thermodynamic driving force for self-assembly. A small preference for interactions between similar monomers (styrene with styrene, methacrylate with methacrylate) is amplified by the large number of monomers in the polymer to cause microphase separation into regions composed almost entirely of one monomer or the other. The volume fractions of each block in the final polymer control the shapes of the self-assembled domains. A di-block copolymer made up of equal volume fractions of its two monomers will adopt a lamellar morphology, while decreasing the fraction of one block away from 0.5 produces a morphology with inner cylindrical domains of the minority block surrounded by an outer domain of the majority block. Further reductions in the volume fraction of the minority block (below 0.33) produce a morphology of minority block spheres embedded in the majority matrix. The overall molecular weight of the polymer defines the size of each domain, with larger polymers producing larger domains. With PS-b-PMMA (PMMA is the minority block), heating to about 200° C. initiates the self-assembly process.

Figure 5A:
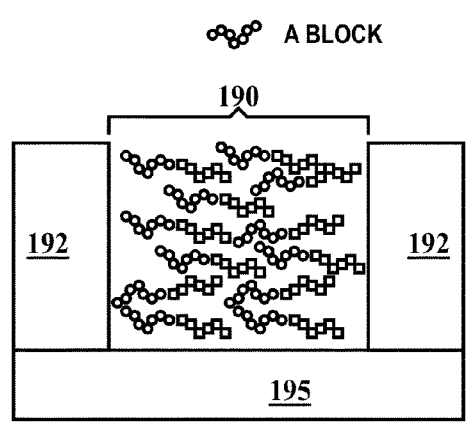
FIGS. 5A and 5B illustrate the features of domain formation of a self-assembly material in a guiding pattern.
Figure 5B:
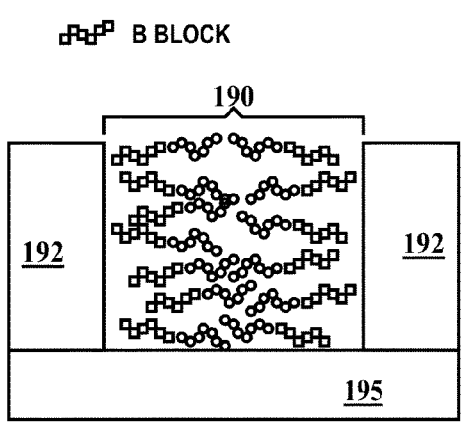

FIGS. 5A and 5B illustrate the features of domain formation of a self-assembly material in a guiding pattern. In FIG. 5A, an A-b-B polymer is placed in a guiding pattern 190 formed in a patterned layer 192 on a substrate 195. There are three interactions that describe the domain formation in FIG. 5B. The first interaction is within the A-b-B polymer itself (i.e., the attraction of A monomers to A monomers and B monomers to B monomers). The second interaction is between the A-b-B polymer and the material of the patterned layer 192. The third interaction is between the A-b-B polymer and substrate 195.

To model the DSA process, the three interactions described supra must be considered. During the self-assembly process, only the self-assembling material moves or rearranges, so the substrate and guiding pattern can be treated as rigid objects. If there is a sufficient model for the interactions of all the components, simulation techniques such as molecular dynamics (MD), Langevin dynamics (LD), or Monte Carlo (MC) or other optimization techniques such as self-consistent field theory (SCFT) can be used to find the stable self-assembled structure adopted by the self-assembly material in the presence of a particular guiding pattern shape and substrate. All of these methods involve significant computational expense. For example, a typical DSA scenario might involve a 50 nm thick layer of PS-b-PMMA with a molecular weight of 100 kD assembling in a guiding pattern of area 200×100 nm². This total volume of $10^6$ nm³ is occupied by 6.5×$10^3$ polymers made up of ~$10^8$ atoms. Using one of the above simulation techniques in this scenario would require hundreds to thousands of computer processing unit (CPU)-hours to produce an accurate estimate of the self-assembled structure. Scaling this approach up to consider the ~$10^9$ transistors on a modern microprocessor would require an intractable $10^{11}$ CPU-hours.

To avoid intractable CPU time and still generate accurate guiding patterns, the embodiments of the present invention disclose a simplified model of the directed self-assembly process for the case of cylinder-forming self-assembling polymers confined in a relatively small guiding patterns of about 500 nm by about 500 nm. While the simplified model is described for the case where the self-assembled cylinders extend the full thickness of the self-assembled material, it is also applicable to model the behavior of partial cylindrical domains that do not extend through the full thickness of the material.

Figure 6:
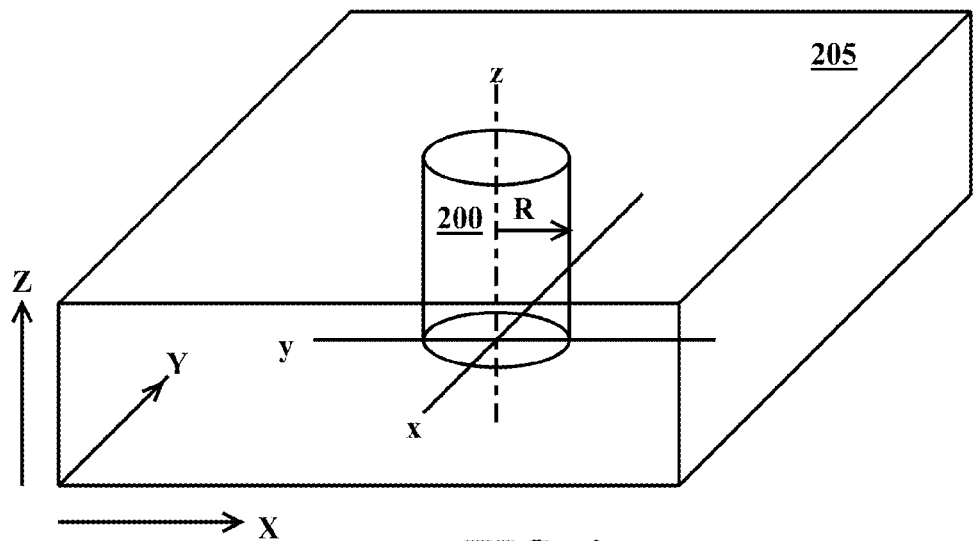
FIG. 6 illustrates the cylinder indicator function W(x,y,{r}) according to embodiments of the present invention.

An indicator function is a function whose value is 1 if a condition is fulfilled and 0 if it is not. The indicator function $W(x,y,\{r\})$ considers a cylindrical region of a specified radius whose axis is aligned normal to the top surface of the substrate and passes through the point (x,y). Mathematically, it is a function of both the location (x,y) as well as the set of positions of all the atoms in the self-assembling polymers ($\{r\}$). In practice, the value of W is only influenced by the subset of atoms of the self-assembling polymers that are within the cylindrical region centered at (x,y). The cylinder radius is approximately the same radius as the cylinders formed by the self-assembling polymer. $W(x,y,\{r\})$ takes a value of 1 if this cylindrical region is entirely filled with the minority component of the polymer (e.g., a cylindrical self-assembled domain is present and centered on (x,y)) and 0 otherwise. The shape of the indicator function and the values it takes on in different locations are illustrated in FIG. 6. An alternative, but more complex indicator function, could include an outer region or cylindrical shell which needs to be occupied by the majority component in addition to the requirement for the inner cylinder to be occupied by the minority component.

FIG. 6 illustrates the cylinder indication function $W(x,y,\{r\})$ according to embodiments of the present invention. In FIG. 6, a cylindrical inner domain 200 of radius "r" is located at the position x,y and surrounded by an outer domain 205.

Using the framework of statistical mechanics, the expectation value $\langle W(x,y,\{r\})\rangle$ can be calculated by integrating over all possible configurations of the atoms of the self-assembling material:

$$\langle W(x, y, \{r\})\rangle = \frac{\int_V d\{r\} W(x, y, \{\vec{r}\}) e^{-U(\{r\})/kT}}{\int_V d\{r\} e^{-U(\{r\})/kT}} \quad (1)$$

Where:

$\langle W(x,y,\{r\})\rangle$ is the probability for finding a self-assembled cylinder centered at (x,y), averaged over all possible values of $\{r\}$, $\{r\}$ is the set of coordinates of all the atoms of the self-assembling material, and $U(\{r\})$ is the energy associated with a particular configuration of coordinates, and each coordinate is allowed to vary throughout the full volume V.

This probability goes to zero for points (x,y) that lie within the guiding pattern material rather than within the open area of the guiding pattern. It will be maximized at positions (x,y) that correspond to favorable environments for a self-assembled cylinder. It is a probability rather than a certainty because of the stochastic nature of the self-assembly process. In some guiding patterns, it is possible for two or more different arrangements of self-assembled cylinders to form. This situation was illustrated in FIG. 3B.

Importantly, the function $\langle W(x,y,\{r\})\rangle$ is exactly the "DSA domain probability function" $P(x,y)$ we need from a predictive DSA model so:

$$P(x,y)=\langle W(x,y,\{r\})\rangle \quad (2)$$

The corresponding "potential of mean force" $F(x,y)$ in reduced units is defined as:

$$F(x,y)=\ln \langle W(x,y,\{r\})\rangle \quad (3)$$

$$\langle W(x,y,\{r\})\rangle = e^{-F\{x,y\}} \quad (4)$$

Or, in terms of $P(x,y)$, making use of Equation (2):

$$F(x,y)=-\ln P(x,y) \quad (5)$$

$$P(x,y)=e^{-F\{x,y\}} \quad (6)$$

Figure 7:
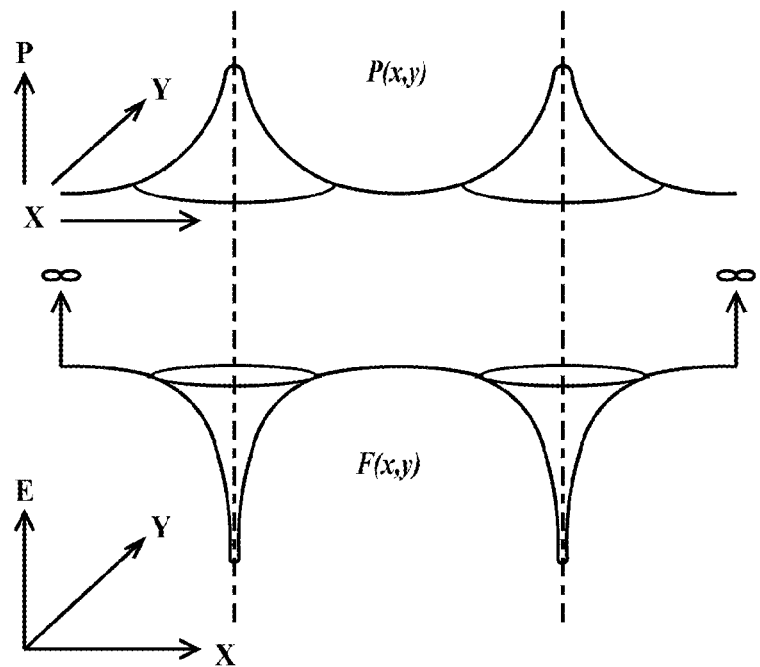
FIG. 7 illustrates the relationship between the domain probability function P(x,y) and the corresponding potential of mean force F(x,y) according to embodiments of the present invention.

These relationships between $P(x,y)$ and $F(x,y)$ are illustrated in FIG. 7. A "potential of mean force" is a term of art in statistical mechanics defined as an effective potential energy that is a function of one or more coordinates (x and y in this case) and that reproduces the observed probability distribution(s) in those coordinates when simulations are carried out using the effective potential energy.

FIG. 7 illustrates the relationship between the domain probability function $P(x,y)$ and the corresponding potential of mean force $F(x,y)$ according to embodiments of the present invention. In FIG. 7, there are two high-probability regions indicated by the pairs of upper and lower cones. The axes of the $P(x,y)$ function are x, y and P where P is the probability of domain formation at coordinates x and y. The axes of the $F(x,y)$ function are x, y and F where F is the free energy of domain formation at coordinates x and y. $P(x,y)$ and $F(x,y)$ are related by equations (5) and (6).

$F(x,y)$ is an effective potential acting on a self-assembled cylinder centered at (x,y). A cylinder that happens to form at a location with a large value of F will tend to move from that position to one with a lower value of F. This movement could occur by the gradual, coordinated movement of all of the polymer chains forming the cylinder, or by the dissolution of the cylindrical structure and its reformation in another location. Stable locations for cylinders correspond to local minima in F, and the most probable locations correspond to low-lying (or global) minima in F. These properties are illustrated in FIG. 8.

Figure 8:
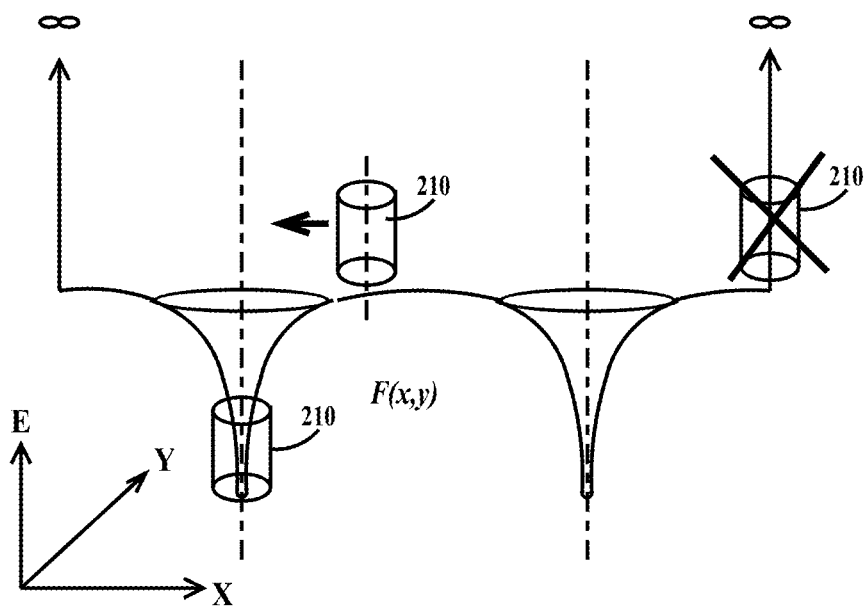
FIG. 8 illustrates the behavior of a self-assembled cylinder location under the influence of the potential of mean force F(x,y) according to embodiments of the present invention.

FIG. 8 illustrates the behavior of a self-assembled cylinder location under the influence of the potential of mean force $F(x,y)$ according to embodiments of the present invention. In FIG. 8, a domain 210 formed between the two minima of $F(x,y)$ where df/dx≠0 will migrate to the closest minima where df/dx=0 (to the left in FIG. 8). Note $F(x,y)$ is bounded by infinity where f(x)=∞, implying $P(x,y)=0$ so domain 210 cannot form in the location marked by the "X."

Figure 9:
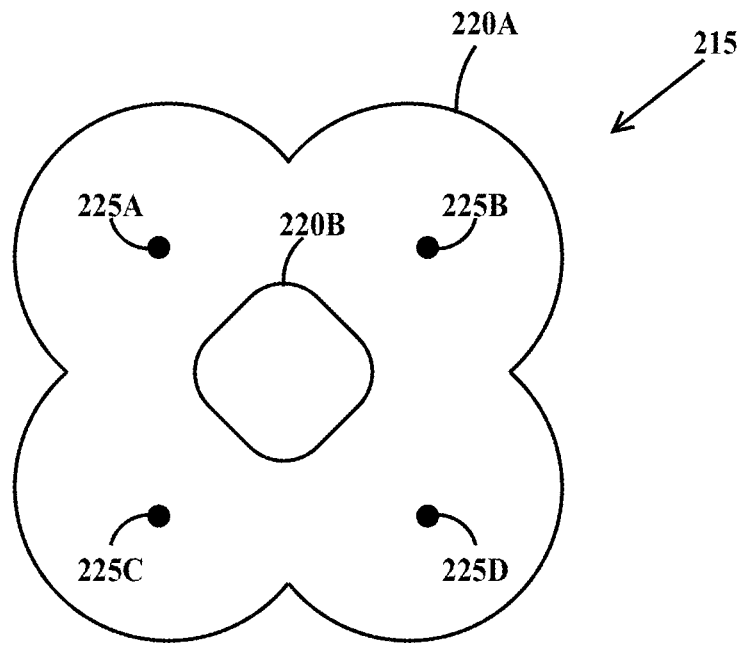
FIG. 9 is an abstract representation of directed self-assembly in terms of cylinder locations and the guiding pattern walls according to embodiments of the present invention.

While it is possible to use full three-dimensional simulations as described earlier to calculate $F(x,y)$ (or $\langle W(x,y,\{r\})\rangle$), such an approach would be very expensive since different simulations would likely be required for each (x,y)

value of interest. Instead, an approximate two-dimensional form for F that is simple and quick to calculate is used as illustrated in FIG. 9. FIG. 9 is an abstract representation of directed self-assembly in terms of cylinder locations and the guiding pattern walls according to embodiments of the present invention. Any given guiding pattern (e.g., guiding pattern 215), in top view, can be abstracted as a set of open regions (places that will be filled by self-assembly material) bounded by walls 220A and 220B of the material composing the guiding pattern. The combined system of guiding pattern and self-assembly material can be abstracted to a set of N (i= 1 . . . N) cylinder locations $(x_i, y_i)$ (N=4 at locations 225A, 225B, 225C and 225D in FIG. 9) within guiding pattern 215 whose walls are defined by a set of M (l=1 . . . M) points, the locations $(x_l, y_l)$. This two-dimensional abstraction of the DSA problem is the first key approximation DSA model according to embodiments of the present invention. The abstraction reduces the number of variables in the problem by many orders of magnitude, greatly speeding any calculations needed.

Working with this abstraction, the fundamental approximation is that F can be approximated as a sum of pairwise (or "two-body") terms. By "pairwise" it is meant that each term in the sum is dependent on the positions of only two entities in the abstraction (i.e., two cylinders, or a cylinder and a wall point, but not a cylinder and two wall points at the same time). This pairwise approximation is the second key approximation the DSA model according to embodiments of the present invention. The complete equation for F, even in the context of the abstraction, contains contributions from one-body, two-body, three-body and higher terms. This "many-body expansion" is a standard tool for representing energy functions in statistical mechanics; here it is applied to an effective potential F instead. Part of the motivation for working in terms of F rather than P is that it is straightforward to decompose energy-like terms (i.e., F) in a many-body expansion, but probabilities cannot be similarly decomposed into sums. One-body terms can be ignored since they only contribute an additive constant to F. Three-body and higher terms need to be discarded since the computational cost scales as $n^m$ (where n is the number of entities in the problem and m is the order of the term, m=3 for a three-body term). The pairwise approximation of retaining only the two-body terms strikes a balance between computational time and accuracy. Equation 7 expresses F given the two key approximations discussed above.

$$F(\{x_i, y_i\}, \{x_l, y_l\}) \approx \sum_{i=1}^{N} \sum_{l=1}^{M} g(x_i, y_i, x_l, y_l) + \sum_{i=1}^{N-1} \sum_{j=i+1}^{N} h(x_i, y_i, x_l, y_l) \quad (7)$$

Where:
F is the relative probability, expressed as an effective potential acting on a self-assembled domain, of the formation of a set of self-assembled domains within a guiding pattern shape,
$\{x_i, y_i\}$ are locations of self-assembled domains,
$\{x_l, y_l\}$ are the locations of the walls of a guiding pattern opening,
g is a function that describes the interaction of a self-assembled domain modeled as a cylinder and the wall of the guiding pattern opening,
h is a function that describes the interaction between pairs of self-assembled domains modeled as cylinders, N is the number of self-assembled domains within the guiding pattern opening, and
M is the number of points defining the wall locations of the guiding pattern opening.

The first double sum in Equation (7) represents contributions to F from interactions of the material composing each cylinder with the material forming the walls of the guiding pattern, and the second double sum represents interactions between the material composing pairs of cylinders. These interactions are illustrated schematically in FIG. 10A. In practice, the summed functions g (the "cylinder-wall interaction") and h (the "cylinder-cylinder" interaction) are only functions of the distances between the interacting components:

$$F(\{x_i, y_i\}, \{x_l, y_l\}) \approx \sum_{i=1}^{N} \sum_{l=1}^{M} g\left(\sqrt{(x_i - x_l)^2 + (y_i - y_l)^2}\right) + \sum_{i=1}^{N-1} \sum_{j=i+1}^{N} h\left(\sqrt{(x_i - x_j)^2 + (y_i - y_j)^2}\right) \quad (8)$$

Where again:
F is the relative probability, expressed as an effective potential acting on a self-assembled domain, of the formation of a set of self-assembled domains within a guiding pattern shape,
$\{x_i, y_i\}$ are locations of self-assembled domains,
$\{x_l, y_l\}$ are the locations of the walls of a guiding pattern opening,
g is a function that describes the interaction of a self-assembled domain modeled as a cylinder and the wall of the guiding pattern opening,
h is a function that describes the interaction between pairs of self-assembled domains modeled as cylinders,
N is the number of self-assembled domains within the guiding pattern opening, and
M is the number of points defining the wall locations of the guiding pattern opening.

Knowledge of the physics of self-assembling materials gives some guidance to the functional forms of g and h. The dense, disordered nature of the self-assembly material means that all interactions are screened, decaying to zero at long distances. For g, we know that cylinders cannot form close to wall elements, and form readily at the center of circular guiding patterns that are ~10-20 times the cylinder diameter. In larger circular guiding patterns, multiple cylinders form. For h, we know that cylinders cannot overlap one another, and have a characteristic separation distance d in the bulk. Examples of representative functions for g and h are shown in FIG. 10 in graphical form. They can be described mathematically as well. An important feature of the approximation of F is that it is an explicit, and at least a once (but ideally a twice), differentiable function of both the cylinder locations $\{(x_i,y_i)\}$ and the locations of the walls of the guiding pattern $\{(x_l,y_l)\}$.

Another physical consideration that can be included in the model is that the material forming the walls of the guiding pattern is solid, and can therefore occlude or block interactions. This means that the self-assembling domain at a particular location only interacts with a wall element at another location if no other wall elements lie in between them. For example, in FIG. 9, self-assembled domain 225A can only interact with regions of wall elements 220A not blocked by wall element 220B and can interact only with regions of wall element 220B in direct lines from self-assembled domain 225A. Similarly, two self-assembling domains can be prevented from interacting if a wall element(s) lies between them. For example, self-assembled domain 225A can interact with self-assembled domains 225B and 225C but will not interact with self-assembled domain 225D due to the intervening wall material of walls 220B. This effect can be implemented in practice by restricting the sums in equation (7) or (8) to only those domain-wall element or domain-domain pairs that are not separated by intervening wall elements.

Figure 10A:
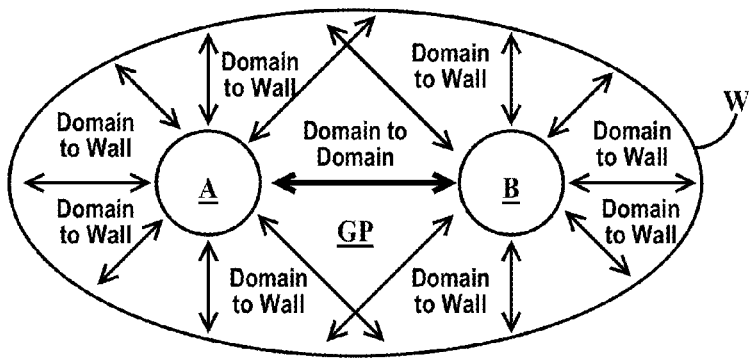
FIGS. 10A-10C illustrate the terms of equation (8) according to embodiments of the present invention.
Figure 10B:
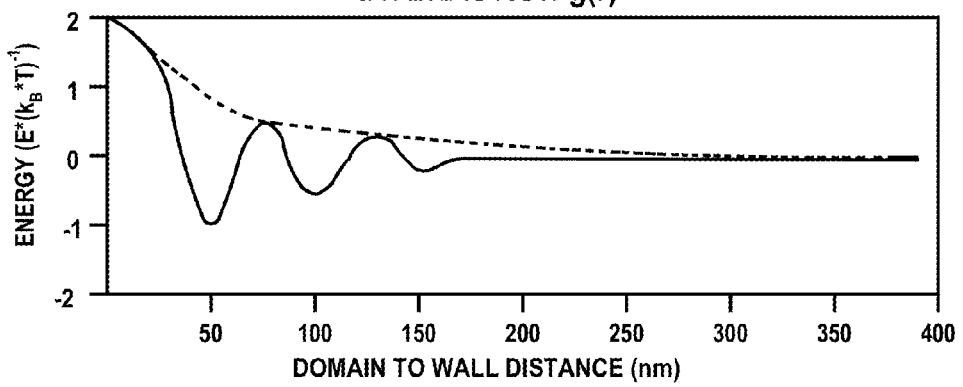
Figure 10C:
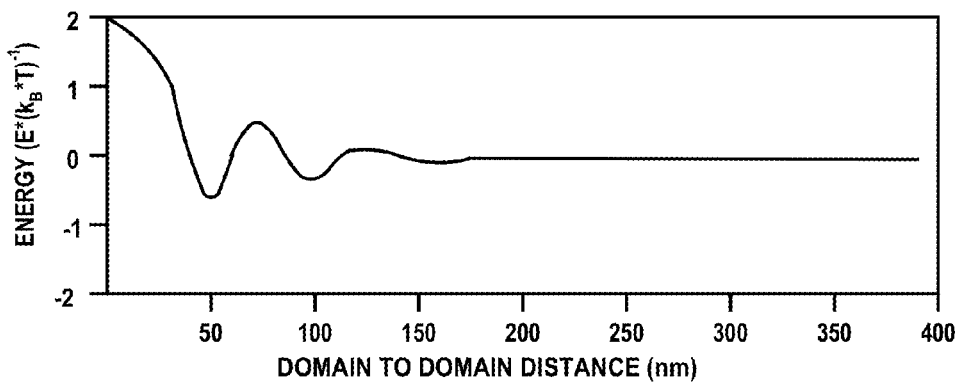

FIGS. 10A-10C illustrate the terms of equation (8) according to embodiments of the present invention. In FIG. 10A, domain A can interact with all regions of wall W of guiding pattern GP that are not blocked in a direct line by domain B. Likewise, domain B can interact with all regions of wall W of guiding pattern GP that are not blocked in a direct line by domain A. Domain A can also interact with domain B. In FIG. 10B, the domain to guiding pattern wall interaction g(r) is plotted as energy (where T is temperature and $k_B$ is Boltzmann's constant) versus domain to wall distance. Since FIG. 10A is symmetrical, FIG. 10B is the same for both domain A and domain B. In FIG. 10C, the domain to domain interaction h(r) is plotted as energy versus domain to domain distance.

Equation (8) can be used to obtain a fast and accurate approximation to F for use in designing guiding patterns in two modes, a forward mode and an inverse mode described infra. In the forward mode, the model is used to predict self-assembled domain locations within a given guiding pattern shape. These locations can then be compared to a desired target design, and the guiding pattern shape iteratively modified and re-evaluated with the model until the desired design is achieved.

Figure 11:
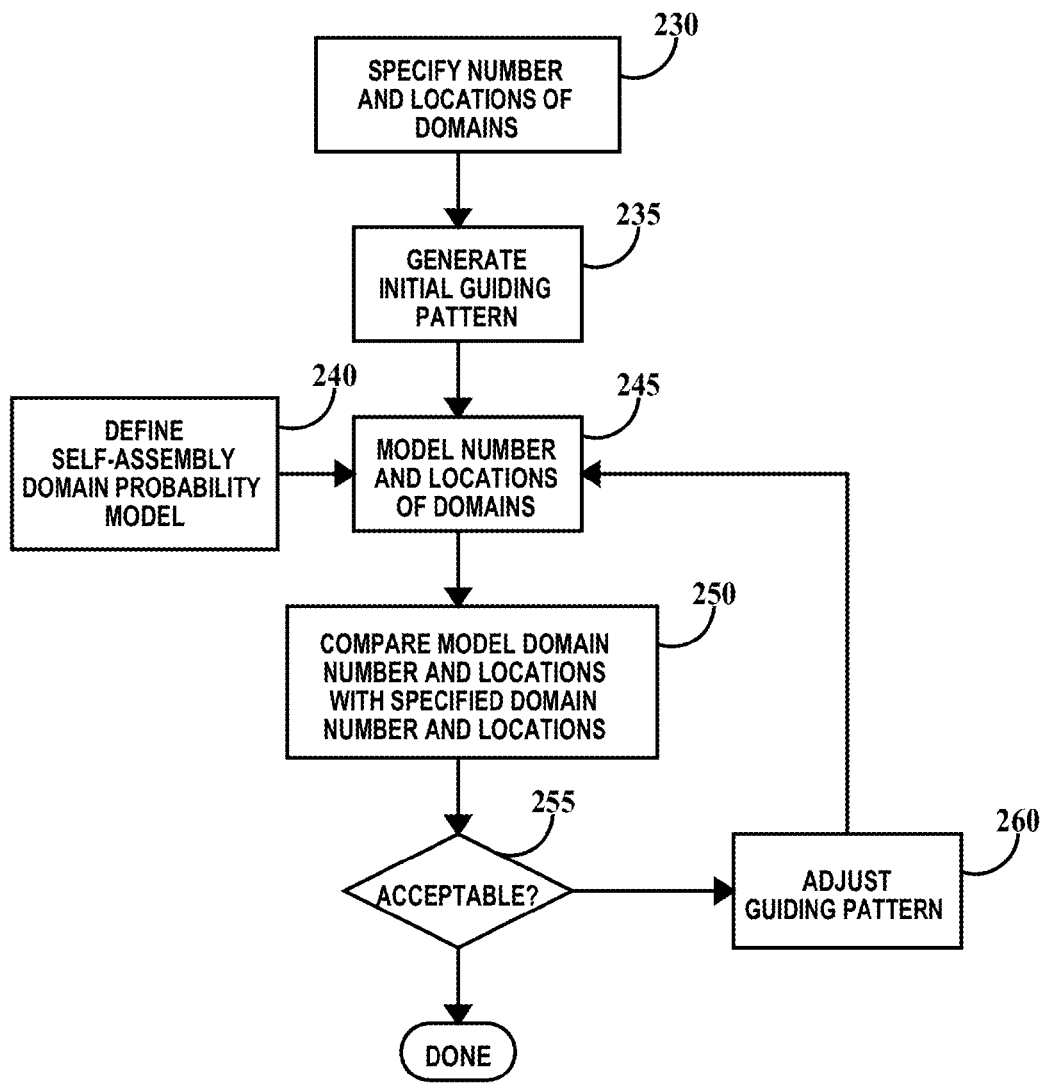
FIG. 11 is a flowchart of a forward guiding pattern design method according to embodiments of the present invention.

FIG. 11 is a flowchart of a forward guiding pattern design method according to embodiments of the present invention. In step 230, the number and locations of cylindrical domains are specified (e.g., the inner domains 135A and 135B of FIG. 2C). In step 235, an initial guiding pattern is generated. This becomes the current guiding pattern. In step 240, the self-assembly domain probability model (e.g., equation 8 or 12) is defined and in step 245, the probability model is used to model the number and locations (minima of F) of cylindrical domains using the current guiding pattern. In step 250, the model results with respect to number and locations of cylindrical domains are compared to the specified number and locations of cylindrical domains. If the number of modeled domains is the same as the specified number of domains and the locations are within a specified range from the specified locations, the method terminates, otherwise the method proceeds to step 260. In step 260, the current guiding pattern is modified and the method loops back to step 245. Optionally, in step 255, additional filters based on the properties of F at each minimum can also be used. For example, a threshold value of F may be required, ensuring a high probability of self-assembled cylinder formation at each minimum. F can be required to have high curvature at each minimum, implying that the location is well-specified. Minima with low curvature in F correspond to broad troughs with many possible cylinder locations of nearly equal probability. Testing of this approach by comparison of the cylinder locations predicted by F with those observed experimentally in a given guiding pattern shape shows a predictive root-mean-square accuracy of 1-2 nm in domain location.

If equation (8) is differentiable (the derivative of F with regards to cylinder or wall locations can be calculated) it is possible to instead operate in an inverse mode. In an inverse mode, the number and locations of cylindrical domains are specified, and the guiding pattern shape is optimized directly based on values of the derivatives of F. This produces the ideal guiding pattern shape for a given pattern without the iterative cycles of comparing and modifying of the forward model.

In an inverse mode, an initial guiding pattern shape $\{(x_1(0),y_1(0))\}$ (0 indicates the initial or $0^{th}$ step of optimization) is constructed from specified domain locations $\{(x_i,y_i)\}$ and the guiding pattern shape is optimized to minimize $F(\{(x_i,y_i)\}, \{(x_l,y_l)\})$. By minimizing $F(\{(x_i,y_i)\}, \{(x_l,y_l)\})$, the probability of finding self-assembled cylinders at the specified domain locations is maximized. The partial derivatives of F in terms of the $x_1$ and $y_1$ variables describing the guiding pattern shape, i.e., the sets $\{\partial F/\partial x_1\}$ and $\{\partial F/\partial y_1\}$, provide information about how F will change with changes in the guiding pattern shape. If the partial derivative $\partial F/\partial x_0$ is positive, F will increase if $x_0$ is increased and decrease if it is decreased. If a particular partial derivative is zero, F will be unaffected by small changes in that variable. At a local extremum (minimum or maximum) of F all partial derivatives are zero. Given that the partial derivatives of F are available, a simple gradient-based optimization (or more sophisticated optimization algorithms) to find a guiding pattern shape that minimizes F can be used. Gradient-based optimization is an iterative algorithm that updates the optimization variables by small increments in the direction opposite of the corresponding partial derivative:

$$x_l(n+1) = x_l(n) - \gamma \frac{\partial F(n)}{\partial x_l} \quad (9)$$

$$y_l(n+1) = y_l(n) - \gamma \frac{\partial F(n)}{\partial y_l} \quad (10)$$

Where:
n is the iteration step of the optimization,
γ is a positive constant controlling the step length of the descent,
F(n) represents $F(\{(x_i,y_i)\}, \{(x_1(n),y_1(n))\})$,
$\{x_i, y_i\}$ are locations of self-assembled domains, and
$\{x_l,y_l\}$ are the location of the walls of a guiding pattern openings.

The step length γ has an initial large value but if at any point F(n+1)>F(n), iteration n+1 is rejected, γ is decreased and a new set of $\{(x_1(n+1),y_1(n+1))\}$ guiding pattern coordinates is generated. Gradient descent iterations are continued until a minimum in F is found. It is important to note that the cylinder locations $\{(x_i,y_i)\}$ are kept fixed during this optimization; only the points describing the guiding pattern shape $\{(x_1,y_1)\}$ are allowed to vary. The use of this approach to optimize guiding pattern shapes is shown schematically in FIG. 12. Alternative optimization schemes could be used similarly.

Figure 12A:
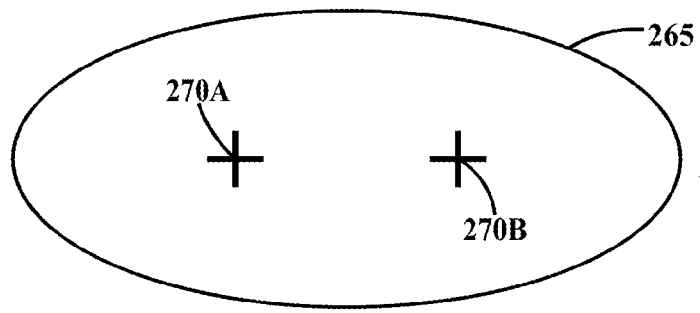
FIGS. 12A-12D illustrate a gradient based optimization algorithm based on derivatives of equations (9) and (10) according to embodiments of the present invention.
Figure 12B:
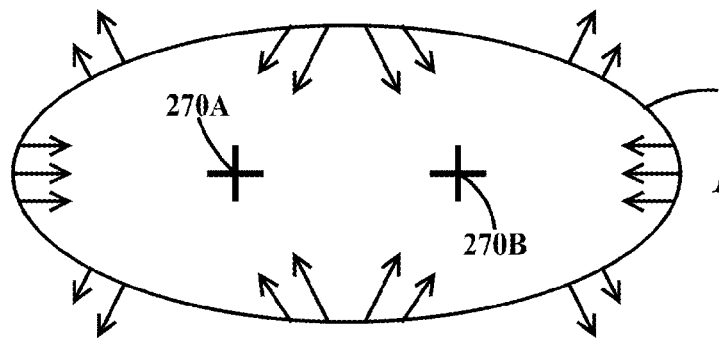
Figure 12C:
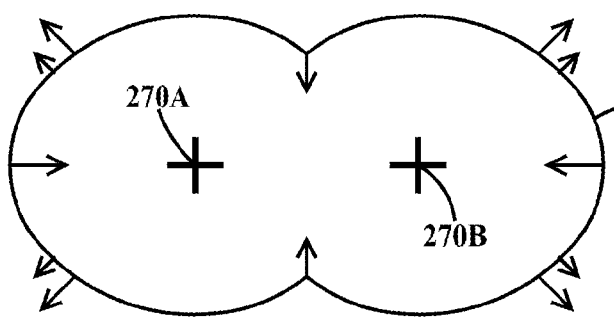
Figure 12D:
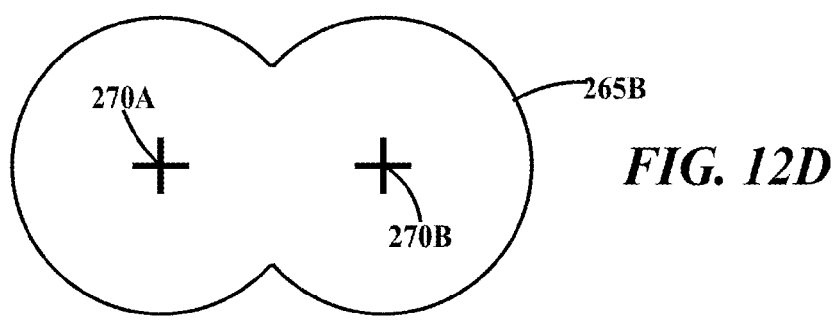

FIGS. 12A-12D illustrate a gradient based optimization algorithm based on derivatives of equation (8) or (12) according to embodiments of the present invention. In FIG. 12A, an initial guiding pattern 265 and specified domain locations 270A and 270B are specified. In FIG. 12B, F(0) is, for example, −20 and the direction and length of the arrows indicates the direction and magnitude of adjustments to be made to guiding pattern 265 using equations (9) and (10) based on $\partial F/\partial x_i$ and $\partial F/\partial y_i$. In FIG. 12C, after the optimization called for in FIG. 12B, there are still some adjustments to be made as indicated by the arrows, but F(1) has been reduced, for example, to −50. In FIG. 12D, after the optimization called for in FIG. 12C, there are no more adjustments to be made as indicated by the lack of arrows, and F(2) has been reduced, for example, to −80.

Simply using F as the objective function will find the guiding pattern shape most likely to yield self-assembled cylinders at the desired locations, but does not guarantee that these desired locations correspond to local minima of F. In mathematical language, the optimization ensures that the partial derivatives of F in all of the guiding pattern shape coordinates are zero, but does not guarantee that the partial derivatives of F in the self-assembled cylinder locations are also zero. This means that it may be possible to move the self-assembled cylinder locations within the optimized guiding shape to achieve an even lower value of F, at the cost of no longer satisfying the target design. To simultaneously optimize for this second condition as well, the method of Lagrange multipliers can be used. The method of Lagrange multipliers is a mathematical technique for optimizing a function (F, in this case) subject to additional constraints. A new function is established consisting of the original function plus one term for each constraint which is the product of a new variable, the Lagrange multiplier, and a term that is zero when the constraint is satisfied.

To simultaneously minimize F and ensure that the partial derivatives of F in terms of the self-assembled cylinder locations $\{(x_i,y_i)\}$ are zero, we introduce a new objective function G:

$$G = F + \sum_{i=1}^{N}\left(\lambda_i\left(\frac{\partial F}{\partial x_i}\right)^2 + \mu_i\left(\frac{\partial F}{\partial y_i}\right)^2\right) \tag{11}$$

Where:

$\lambda_i$ and $\mu_i$ are the Lagrange multipliers (>0) for the x- and y-components of the derivative of F at cylinder location i.

Minimizing G requires both minimizing F and satisfying the condition that these derivatives go to zero. Since G now contains terms in $\{\partial F/\partial x_i\}$ and $\{\partial F/\partial y_i\}$, the partial derivatives of G in terms of the guiding pattern shape $\{\partial G/\partial x_l\}$ and $\{\partial G/\partial y_l\}$ will themselves contain contributions of the form $\partial(\{\partial F/\partial x_i\})/\partial x_l$. These second derivative contributions reflect how changing the guiding shape at a particular point changes the derivative of F at a particular cylinder location, and are the reason why ideal forms of F are twice differentiable. Other forms of constraint (e.g., constraints on higher derivatives of F or constraints reflecting lithographic design rules) can be introduced similarly. The difference between optimizing F and optimizing G is illustrated in FIG. 13.

Figure 13A:
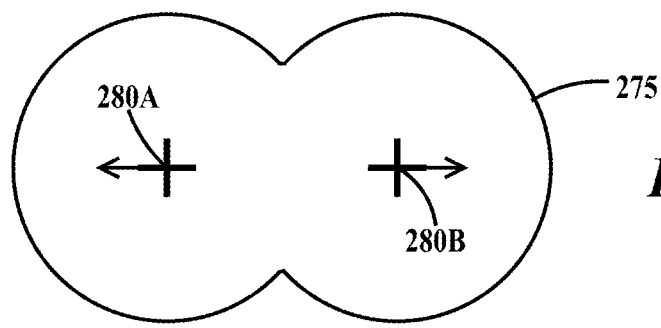
FIGS. 13A-13C illustrate the differences between optimization of the derivatives to a minima and optimization of the derivatives to a zero.
Figure 13B:
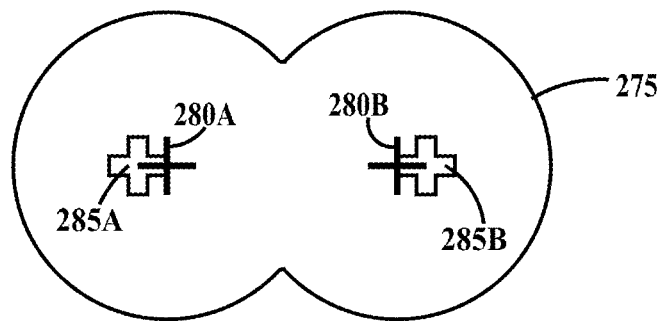
Figure 13C:
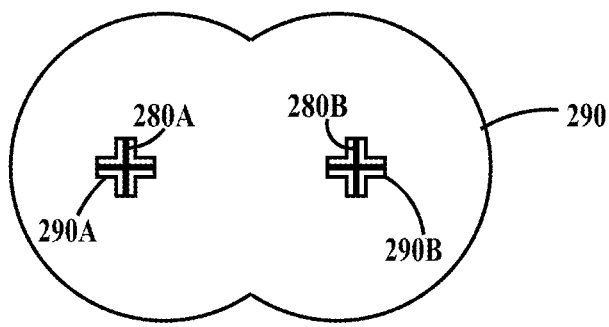

FIGS. 13A-13C illustrate the differences between optimization of the derivatives to a minima and optimization of the derivatives to a zero. In FIG. 13A, a guiding pattern 275 and two specified domain locations 280A and 280B are illustrated. The partial derivatives of F in terms of these domain locations ($\partial F/\partial x_i$, $\partial F/\partial y_i$) are shown as arrows. In FIG. 13B, optimizing for F only (so that −$\partial F/\partial x_i$ and −$\partial F/\partial y_i$ are not both zero) results in the actual domain locations 285A and 285B which are offset from respective specified locations 280A and 280B. In FIG. 13C G is optimized instead of F (−$\partial F/\partial x_i$ and −$\partial F/\partial y_i$ are both zero) so actual domains 290A and 290B are in the same locations as respective specified locations 280A and 280B. Optimizing G finds the minimum of F that also ensures the self-assembled cylinder locations are stable and do not move during the DSA process.

Most mask designs, while they explicitly specify desired self-assembled cylinder domain locations, also implicitly specify undesired self-assembled cylinder locations (i.e., anywhere a self-assembled cylinder is not requested). This can be treated in an inverse model by adding a new set of L "undesired locations" $\{(x_u,y_u)\}$ and optimizing a modified F':

$$F'(\{x_i, y_i\}, \{x_l, y_l\}, \{x_u, y_u\}) \approx \sum_{i=1}^{N}\sum_{l=1}^{M} g(x_i, y_i, x_l, y_l) + \sum_{i=1}^{N-1}\sum_{j=i+1}^{N} h(x_i, y_i, x_l, y_l) - \sum_{u=1}^{L}\sum_{l=1}^{M} g(x_u, y_u, x_l, y_l) \tag{12}$$

Where:

F' is the relative probability, expressed as an effective potential acting on a self-assembled domain, of the formation of a set of self-assembled domains within a guiding pattern shape, $\{x_i, y_i\}$ are locations of self-assembled domains, $\{x_l, y_l\}$ are the locations of the walls of a guiding pattern opening, $\{x_u, y_u\}$ are locations where self-assembled domains are not to be formed, g is a function that describes the interaction of a self-assembled domain modeled as a cylinder and the wall of the guiding pattern opening, h is a function that describes the interaction between pairs of self-assembled domains modeled as cylinders, N is the number of self-assembled domains within the guiding pattern opening, M is the number of points defining the wall locations of the guiding pattern opening; and L is the number of locations where self-assembled domains are not to be formed.

The corresponding form of equation (12) that depends only on distances rather than locations is:

$$F(\{x_i, y_i\}, \{x_l, y_l\}) \approx \sum_{i=1}^{N}\sum_{l=1}^{M} g\left(\sqrt{(x_i-x_l)^2 + (y_i-y_l)^2}\right) + \sum_{i=1}^{N-1}\sum_{j=i+1}^{N} h\left(\sqrt{(x_i-x_j)^2 + (y_i-y_j)^2}\right) - \sum_{u=1}^{L}\sum_{l=1}^{M} g\left(\sqrt{(x_u-x_l)^2 + (y_u-y_l)^2}\right) \tag{13}$$

Again, F' can be directly optimized by gradient-based optimization in analogy to Equations 9 and 10:

$$x_l(n+1) = x_l(n) - \gamma\frac{\partial F'(n)}{\partial x_l} \tag{14}$$

$$y_l(n+1) = y_l(n) - \gamma\frac{\partial F'(n)}{\partial y_l} \tag{15}$$

If desired, it is also possible to use the Lagrange multiplier method to additionally ensure that the optimization of F' also ensures that the target via locations correspond to local minima of F', by constructing a new target function G' in the same manner as equation 12:

$$G' = F' + \sum_{i=1}^{N}\left(\lambda_i\left(\frac{\partial F'}{\partial x_i}\right)^2 + \mu_i\left(\frac{\partial F'}{\partial y_i}\right)^2\right) \quad (16)$$

Optimizing G' by numerical approaches will yield a guiding pattern shape that: (i) maximizes the probabilities of self-assembled domains form at the desired locations; (ii) minimizes the probabilities of self-assembled domains forming at the undesired locations; and (iii) ensures that the target via locations correspond to local minima in F' (local maxima in the probability). If there are other known properties of the desired solution (e.g., smoothness or size of the guiding pattern shape) they can be included in the optimization by adding additional terms to F' or G' in a similar fashion.

Figure 14:
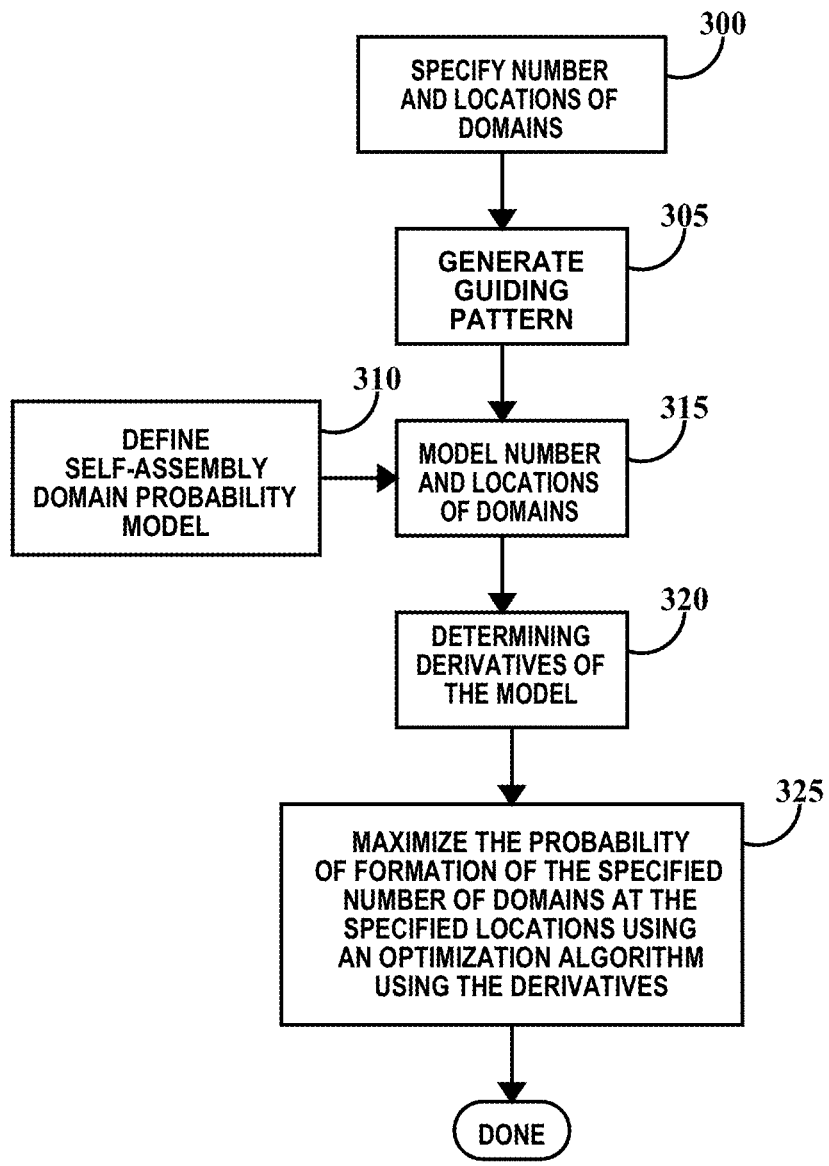
FIG. 14 is a flowchart of an inverse guiding pattern design method according to embodiments of the present invention.

FIG. 14 is a flowchart of the inverse guiding pattern design method according to embodiments of the present invention. In step 300, the number and locations of cylindrical domains is specified (e.g., the inner domains 135A and 135B of FIG. 2C). In step 305, a guiding pattern is generated. In step 310, the self-assembly domain probability model (e.g., equation 8 or 12) is defined and in step 315, the probability model is used to model the number and locations of cylindrical domains using the guiding pattern. In step 320, the partial derivatives of the model are determined and in step 325, the probability of formation of the specified number of cylindrical domains at specified locations is maximized using an optimization algorithm based on the partial derivatives of the model. In one example, the optimization algorithm is a gradient descent algorithm as described supra.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. In one example, the computer readable medium is a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

In one example, the computer readable medium is a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one example, program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Generally, the method described herein with respect to methods for designing topographic patterns for directing the formation of self-assembly domains at specified locations on substrates is practiced with a general-purpose computer and the methods described supra in the flow diagrams of FIGS. 11 and 14 may be coded as a set of instructions on removable or hard media for use by the general-purpose computer.

Figure 15:
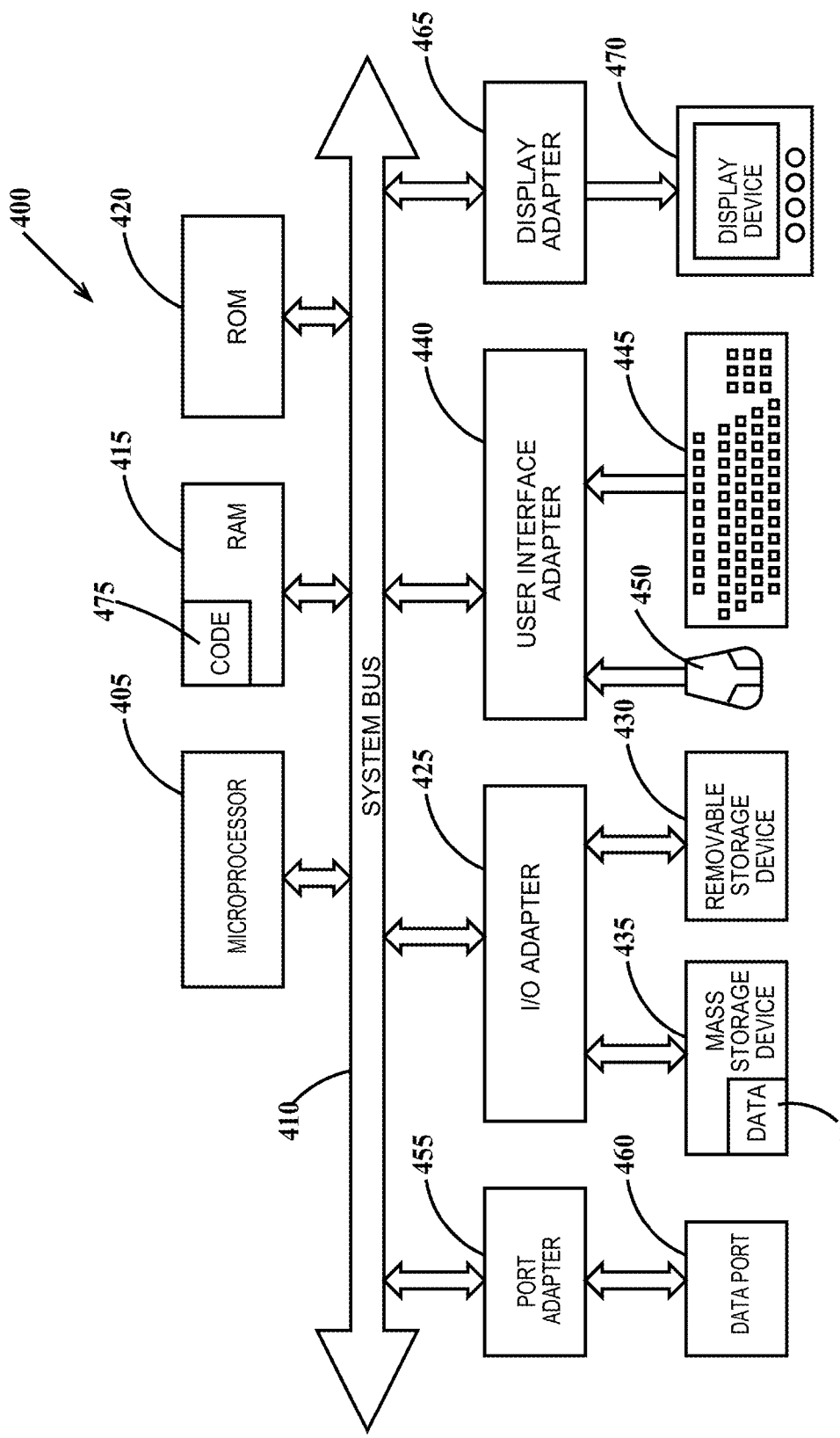
FIG. 15 is a schematic block diagram of a computer that may be used in implementing preferred methods disclosed herein.

FIG. 15 is a schematic block diagram of a computer that may be used in implementing preferred methods disclosed herein. In FIG. 15, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include electronic, magnetic, optical, electromagnetic, infrared, and semiconductor devices. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for the computer program created to run the present invention is loaded on the appropriate removable data and/or program storage device 430, fed through data port 460 or typed in using keyboard 445.

Thus the embodiments of the present invention provide methods and computer program products for designing topographic patterns (i.e., guiding patterns) for directing the formation of self-assembly domains at specified locations on substrates which a very high probability that that the number of actual domains will be the same as the specified number of domains and that they will form in the specified locations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of designing a guiding pattern opening in a layer on a substrate, the guiding pattern opening yielding a set of self-assembled domains at specified locations within the guiding pattern opening when the guided pattern opening is filled with a self-assembly material that undergoes directed self-assembly, the method comprising:
   (a) specifying a number and corresponding locations of self-assembled domains;
   (b) generating a mathematical description of an initial guiding pattern opening based on said specified number and locations of self-assembled domains and designating said initial guiding pattern opening as a current guiding pattern opening;
   (c) using a computer, computing a mathematical model to generate calculated numbers and calculated high-probability locations of self-assembled domains within said current guiding pattern opening, wherein said function represents the relative probability that said self-assembled domains will form at said specified locations within said current guiding pattern opening;
   (d) comparing the calculated number of high-probability locations of said mathematical model with said specified number of self-assembled domains and comparing the calculated locations of said high-probability locations with said specified locations of self-assembled domains;
   (e) adjusting the current guiding pattern opening based on said comparing of step (d); and
   (f) repeating steps (c) to (e) until both (i) said calculated number of self-assembled domains and said specified number of self-assembled domains is the same and (ii) said high-probability locations of self-assembled domains and said specified locations of self-assembled domains agree within a specified range.

2. The method of claim 1, wherein said mathematical model is approximated by a function comprising a first contribution that represents the interaction between a self-assembled domain formed at a particular location and said guiding pattern opening, and a second contribution that represents the interaction between a self-assembled domain formed at said particular location and all other self-assembled domains within said current guiding pattern opening.

3. The method of claim 2, including:
   dividing said current guiding pattern opening into a set of geometric elements.

4. The method of claim 3, wherein said guiding pattern opening is represented by a set of two-dimensional points, line segments, curve segments or combinations thereof.

5. The method of claim 3, wherein said first interaction is a sum of contributions corresponding to said geometric elements.

6. The method of claim 3, wherein said first contribution does not include interactions of those geometric elements of the guiding pattern opening that are separated from said self-assembled domain location by another geometric element.

7. The method of claim 3, wherein said second contribution does not include interactions of other self-assembled domains that are separated from said self-assembled domain location by a geometric element of the guiding pattern opening.

8. The method of claim 2, wherein said predicted self-assembled domains are (i) modeled as cylinders oriented perpendicular to a plane and (ii) represented within said mathematical model as a point given by the intersection of the axis of each cylinder with said plane.

9. The method of claim 2 wherein said second interaction is a sum of the interaction of all different pairs of said self-assembled domains.

10. The method of claim 2, wherein said mathematical model is further approximated by a third contribution that represents locations where self-assembled domains are specified not to form within said guiding pattern opening.

11. The method of claim 10, wherein said third contribution interaction is a sum of the interactions between (i) locations where self-assembled domains are specified not to form and (ii) said guiding pattern opening.

12. The method of claim 1, wherein said mathematical model is represented by:

$$F(\{x_i, y_i\}, \{x_l, y_l\}) \approx \sum_{i=1}^{N}\sum_{l=1}^{M} g\left(\sqrt{(x_i - x_l)^2 + (y_i - y_l)^2}\right) + \sum_{i=1}^{N-1}\sum_{j=i+1}^{N} h\left(\sqrt{(x_i - x_j)^2 + (y_i - y_j)^2}\right)$$

where:
F is the relative probability, expressed as an effective potential acting on a self-assembled domain, of the formation of a set of self-assembled domains within a guiding pattern shape,
$\{x_i, y_i\}$ are locations of self-assembled domains,
$\{x_l, y_l\}$ are the locations of the walls of a guiding pattern opening,
g is a function that describes the interaction of a self-assembled domain modeled as a cylinder and the wall of the guiding pattern opening,
h is a function that describes the interaction between pairs of self-assembled domains modeled as cylinders,
N is the number of self-assembled domains within the guiding pattern opening, and
M is the number of points defining the wall locations of the guiding pattern opening.

13. The method of claim 1, wherein said mathematical model is represented by:

$$F(\{x_i, y_i\}, \{x_l, y_l\}) \approx \sum_{i=1}^{N}\sum_{l=1}^{M} g\left(\sqrt{(x_i - x_l)^2 + (y_i - y_l)^2}\right) + \sum_{i=1}^{N-1}\sum_{j=i+1}^{N} h\left(\sqrt{(x_i - x_j)^2 + (y_i - y_j)^2}\right) - \sum_{u=1}^{L}\sum_{l=1}^{M} g\left(\sqrt{(x_u - x_l)^2 + (y_u - y_l)^2}\right)$$

where:
F' is the relative probability, expressed as an effective potential acting on a self-assembled domain, of the formation of a set of self-assembled domains within a guiding pattern shape,
$\{x_i, y_i\}$ are locations of self-assembled domains,
$\{x_l, y_l\}$ are the locations of the walls of a guiding pattern opening,
$\{x_u, y_u\}$ are locations where self-assembled domains are not to be formed,
g is a function that describes the interaction of a self-assembled domain modeled as a cylinder and the wall of the guiding pattern opening,
h is a function that describes the interaction between pairs of self-assembled domains modeled as cylinders,
N is the number of self-assembled domains within the guiding pattern opening,
M is the number of points defining the wall locations of the guiding pattern opening; and
L is the number of locations where self-assembled domains are not to be formed.

14. A method of designing a guiding pattern opening in a layer on a substrate, the guiding pattern opening yielding a set of self-assembled domains at specified locations within the guiding pattern opening when the guided pattern opening is filled with a self-assembly material that undergoes directed self-assembly, the method comprising:
(a) specifying a number and corresponding locations of self-assembled domains;
(b) generating a mathematical description of a guiding pattern opening based on said specified number and locations of self-assembled domains;
(c) defining a mathematical model of the probability of the formation of self-assembled domains based on said mathematical description of said guiding pattern opening;
(d) using a computer, using said mathematical model to compute the probability that said number of specified self-assembled domains will form at said specified locations within the guiding pattern opening;
(e) determining derivatives of said mathematical model with respect to parameters of said mathematical description of said guiding pattern opening; and
(f) maximizing the probability for formation of self-assembled domains at said specified locations within said initial guiding pattern opening using said derivatives to adjust said locations defining the walls of said guiding pattern opening using an optimization algorithm.

15. The method of claim 14, wherein said optimization algorithm is an iterative optimization algorithm repeating steps (d) through (f) until a probability of self-assembled domains forming at said specified locations reaches a specified value.

16. The method of claim 14, herein said optimization algorithm performs gradient descent iterations to reduce said derivatives to specified values, said specified self-assembled domain locations kept fixed during the optimization and wherein only (i) the parameters of said mathematical description of said guiding pattern opening and (ii) a step length of the gradient descent are allowed to change.

17. The method of claim 16, wherein said derivatives of said mathematical model used in said gradient descent iterations are represented by:

$$x_l(n+1) = x_l(n) - \gamma \frac{\partial F(n)}{\partial x_l}$$

$$y_l(n+1) = y_l(n) - \gamma \frac{\partial F(n)}{\partial y_l}$$

where:
n is the iteration step of the optimization,
$\gamma$ is a positive constant controlling the step length of the descent,
F(n) represents $F(\{(x_i, y_i)\}, \{(x_l(n), y_l(n))\})$,
$\{x_i, y_i\}$ are locations of self-assembled domains, and
$\{x_l, y_l\}$ are the location of the walls of a guiding pattern opening.

18. The method of claim 14, wherein said mathematical model is approximated by a function comprising a first contribution that represents the interaction between a self-assembled domain formed at a particular location and said guiding pattern opening and a second contribution that represents the interaction between a self-assembled domain formed at said particular location and all other self-assembled domains within said current guiding pattern opening.

19. The method of claim 18, including:
dividing said current guiding pattern opening into a set of geometric elements.

20. The method of claim 19, wherein said guiding pattern opening is represented by a set of two-dimensional points, line segments, curve segments or combinations thereof.

21. The method of claim 19, wherein said first interaction is a sum of contributions corresponding to said geometric elements.

22. The method of claim of claim 18, wherein said mathematical model is further approximated by a third contribution that represents magnitudes of derivatives of said first and said second contributions with respect to said specified locations of said self-assembled domains.

23. The method of claim 18, wherein said predicted self-assembled domains are modeled as cylinders oriented perpendicular to a plane, said mathematical model operating on a point given by the intersection of the axis of each cylinder with said plane.

24. The method of claim 18, wherein said second interaction is a sum of the interaction of all different pairs of said self-assembled domains.

25. The method of claim 18, wherein said first contribution does not include interactions with those geometric elements of the guiding pattern opening that are separated from said self-assembled domain location by at least one other geometric element.

26. The method of claim 18, wherein said second contribution does not include other self-assembled domains that are separated from said self-assembled domain location by a geometric element of the guiding pattern opening.

27. The method of claim 18, wherein said mathematical model includes a third contribution wherein:
said third contribution represents locations where self-assembled domains specified not to form within said guiding pattern opening.

28. The method of claim 27, wherein said third contribution interaction is a sum of the interactions between (i) locations where self-assembled domains are specified not to form and (ii) said guiding pattern opening.

29. The method of claim 14, wherein said mathematical model is represented by:

$$F(\{x_i, y_i\}, \{x_l, y_l\}) \approx \sum_{i=1}^{N}\sum_{l=1}^{M} g\left(\sqrt{(x_i - x_l)^2 + (y_i - y_l)^2}\right) + \sum_{i=1}^{N-1}\sum_{j=i+1}^{N} h\left(\sqrt{(x_i - x_j)^2 + (y_i - y_j)^2}\right)$$

where:
F is the relative probability, expressed as an effective potential acting on a self-assembled domain, of the formation of a set of self-assembled domains within a guiding pattern shape,
$\{x_i, y_i\}$ are locations of self-assembled domains,
$\{x_l, y_l\}$ are the locations of the walls of a guiding pattern opening,
g is a function that describes the interaction of a self-assembled domain modeled as a cylinder and the wall of the guiding pattern opening,
h is a function that describes the interaction between pairs of self-assembled domains modeled as cylinders,
N is the number of self-assembled domains within the guiding pattern opening, and
M is the number of points defining the wall locations of the guiding pattern opening.

30. The method of claim 14, wherein said mathematical model is represented by:

$$F'(\{x_i, y_i\}, \{x_l, y_l\}, \{x_u, y_u\}) \approx \sum_{i=1}^{N}\sum_{l=1}^{M} g\left(\sqrt{(x_i - x_l)^2 + (y_i - y_l)^2}\right) + \sum_{i=1}^{N-1}\sum_{j=i+1}^{N} h\left(\sqrt{(x_i - x_j)^2 + (y_i - y_j)^2}\right) - \sum_{u=1}^{L}\sum_{l=1}^{M} g\left(\sqrt{(x_u - x_l)^2 + (y_u - y_l)^2}\right)$$

where:
F' is the relative probability, expressed as an effective potential acting on a self-assembled domain, of the formation of a set of self-assembled domains within a guiding pattern shape,
$\{x_i, y_i\}$ are locations of self-assembled domains,
$\{x_l, y_l\}$ are the locations of the walls of a guiding pattern opening,
$\{x_u, y_u\}$ are locations where self-assembled domains are not to be formed,
g is a function that describes the interaction of a self-assembled domain modeled as a cylinder and the wall of the guiding pattern opening,
h is a function that describes the interaction between pairs of self-assembled domains modeled as cylinders,
N is the number of self-assembled domains within the guiding pattern opening,
M is the number of points defining the wall locations of the guiding pattern opening, and
L is the number of locations where self-assembled domains are not to be formed.

31. A non-transitory computer readable storage device having a computer readable program code embodied therein, said computer readable program code comprising an algorithm adapted to implement a method for designing a guiding pattern opening in a layer on a substrate, the guiding pattern opening yielding a set of self-assembled domains at specified locations within the guiding pattern opening when the guided pattern opening is filled with a self-assembly material that undergoes directed self-assembly, said method comprising the steps of:
(a) generating a mathematical description of an initial guiding pattern opening based on a user-specified number of, and corresponding locations of, self-assembled domains;
(b) designating said initial guiding pattern opening as a current guiding pattern opening;
(c) computing a mathematical model to generate calculated numbers and calculated high-probability locations of self-assembled domains within said current guiding pattern opening, wherein said function represents the relative probability that said self-assembled domains will form at said specified locations within said current guiding pattern opening;
(d) comparing the calculated number of high-probability locations of said mathematical model with said specified number of self-assembled domains and comparing the calculated locations of said high-probability locations with said specified locations of self-assembled domains;
(e) adjusting the current guiding pattern opening based on said comparing of step (d); and
(f) repeating steps (c) to (e) until both (i) said calculated number of self-assembled domains and said specified number of self-assembled domains is the same and (ii) said high-probability locations of self-assembled domains and said specified locations of self-assembled domains agree within a specified range.

32. A non-transitory computer readable storage device having a computer readable program code embodied therein, said computer readable program code comprising an algorithm adapted to implement a method for designing a guiding pattern opening in a layer on a substrate, the guiding pattern opening yielding a set of self-assembled domains at specified locations within the guiding pattern opening when the guided pattern opening is filled with a self-assembly material that undergoes directed self-assembly, said method comprising the steps of:

(a) generating a mathematical description of a guiding pattern opening based on a user-specified number of, and corresponding locations of, self-assembled domains;
(b) defining a mathematical model of the probability of the formation of self-assembled domains based on said mathematical description of said guiding pattern opening;
(c) using said mathematical model to compute the probability that said number of specified self-assembled domains will form at said specified locations within the guiding pattern opening;
(d) determining derivatives of said mathematical model with respect to parameters of said mathematical description of said guiding pattern opening; and
(e) maximizing the probability for formation of self-assembled domains at said specified locations within said initial guiding pattern opening using said derivatives to adjust said locations defining the walls of said guiding pattern opening using an optimization algorithm.

\* \* \* \* \*